United States Patent [19]
Garrett et al.

[11] 4,022,629
[45] May 10, 1977

[54] MANUFACTURE OF CEMENT IN ROTARY VESSELS

[75] Inventors: Hoke M. Garrett, Oakland; James A. Murray, Walnut Creek, both of Calif.

[73] Assignee: Kaiser Industries Corporation, Oakland, Calif.

[22] Filed: Feb. 10, 1976

[21] Appl. No.: 656,955

Related U.S. Application Data

[63] Continuation-in-part of Ser. No. 373,737, June 26, 1973, abandoned.

[52] U.S. Cl. .............................. 106/100; 106/103
[51] Int. Cl.² ........................................ C04B 7/02
[58] Field of Search ...................... 106/100, 103

[56] References Cited

UNITED STATES PATENTS

| | | | |
|---|---|---|---|
| 1,244,280 | 10/1917 | Basset | 106/103 |
| 1,746,944 | 2/1930 | Hyde | 106/100 |
| 1,904,699 | 4/1933 | Singmaster | 106/100 |
| 3,875,298 | 4/1975 | Coatney et al. | 423/637 |

OTHER PUBLICATIONS

Industrial Chemical Calculations, O. A. Hougen, PhD., 2nd Edition, 1936, pp. 236–238 and 2 cover pages.

*Primary Examiner*—Winston A. Douglas
*Assistant Examiner*—J. V. Howard
*Attorney, Agent, or Firm*—Schuyler, Birch, Swindler, McKie & Beckett

[57] ABSTRACT

The manufacture of cement clinker in a rotary vessel wherein cement raw materials are heated to complete calcination and effect clinkering by the combustion of fuels in the gaseous atmosphere within the vessel is improved by incorporating into the cement raw materials a residual fuel having a low volatiles content and a high ignition temperature.

24 Claims, 1 Drawing Figure

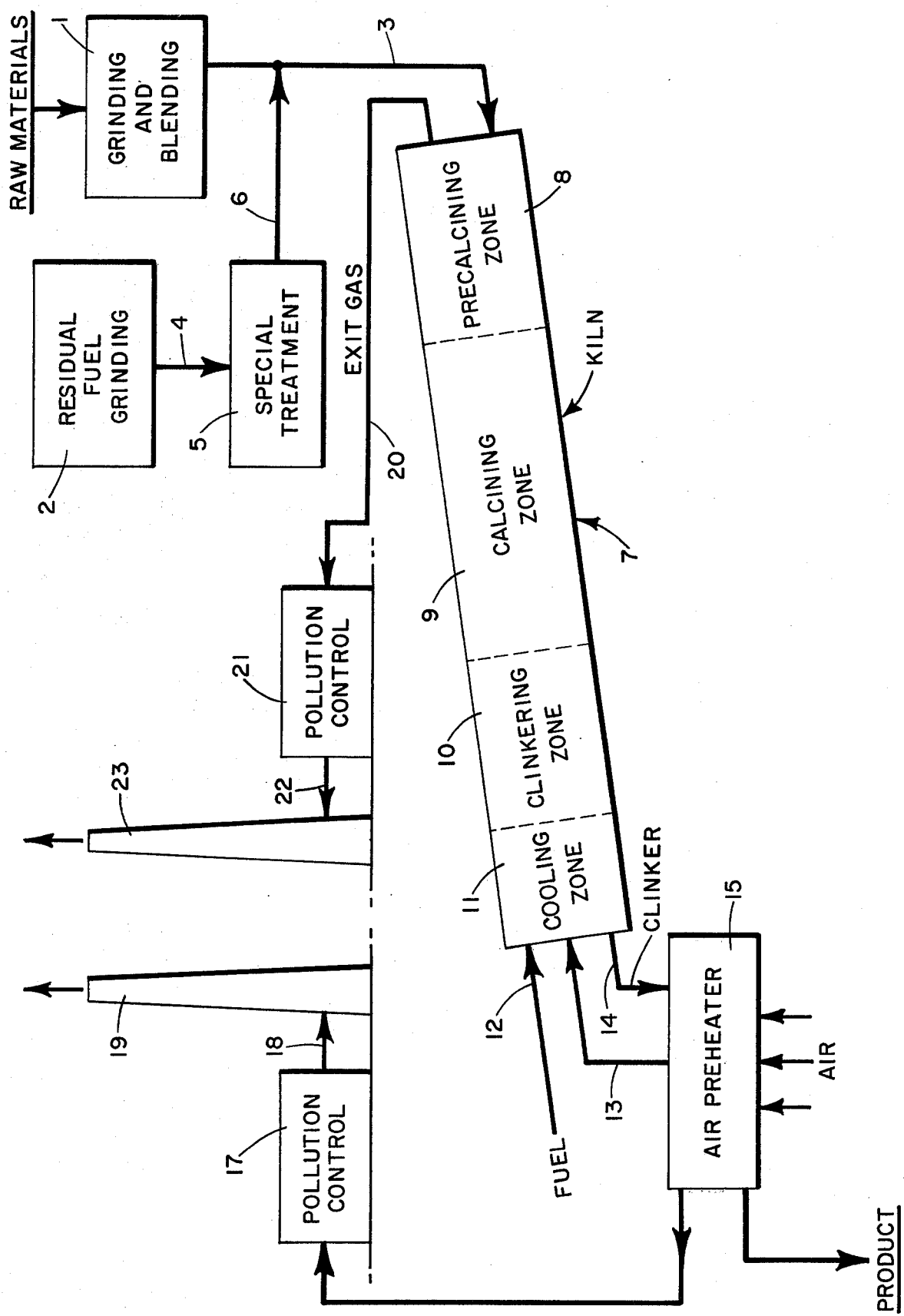

MANUFACTURE OF CEMENT IN ROTARY VESSELS

This application is a continuation-in-part of our co-pending U.S. patent application, Ser. No. 373,737 filed June 26, 1973, now abandoned.

DESCRIPTION OF THE INVENTION

This invention relates to the manufacture of cement clinker in rotary vessels.

Cement clinker may be produced by heating calcareous material with silica and alumina, and frequently other materials, at temperatures on the order of about 2300° – 2900° F to bring about the chemical reactions necessary to convert the ingredients to cement clinker.

The literature is replete with processes by which the calcining and clinkering of cement ingredients can be accomplished. For example, cement raw materials may be mixed with solid fuel and burned with air on a grate to provide a final clinker (e.g., U.S. Pat. Nos. 2,090,363 and 3,135,618) or cement raw materials mixed with fuel may be sintered with air on a grate or the like and the sintered intermediate then clinkered in a rotary kiln, blast furnace or the like (e.g., U.S. Pat. Nos. 1,746,944 and 1,904,699). In still other alternatives, cement raw materials and fuel may be formed into shapes such as pellets, briquets and the like and then burned and clinkered (e.g., U.S. Pat. Nos. 274,288, 1,132,527, 2,904,455, 2,991,187 and 3,127,455).

In the widely used commercial process to which this invention is directed, calcining and clinkering of cement raw materials is accomplished by passing finely divided raw materials through a rotating inclined rotary vessel or kiln. In such process, the requisite temperatures are achieved by burning fuel such as gas, fuel oil, powdered coal or the like, in the gaseous atmosphere of the kiln, with the gases moving countercurrent to the solids through the vessel. Inasmuch as high temperatures are required for the process, fuel costs constitute a significant factor in the ultimate cost of the product and increases in thermal efficiency can have a measurable and favorable impact on production and pollution control costs. Moreover, an increase in thermal efficiency not only reduces the fuel cost and pollution per unit of product, but also increases the capacity of equipment. Since rotary vessels for the production of cement may be 10 feet or more in diameter and 300–400 feet or more in length, equipment considerations are not inconsequential.

It is one object of this invention to provide a process for the manufacture of cement clinker in a rotary vessel characterized, inter alia, by improved thermal efficiency.

It is a further object of this invention to provide a process for the manufacture of cement clinker in a rotary vessel characterized by reduced fuel costs per unit of product.

It is also an object of this invention to provide a process for the manufacture of cement clinker which will increase the productive capacity of existing kilns and allow new facilities of given desired capacity to be constructed with smaller kilns than would be required using prior processes.

It is still a further object of this invention to provide a process for the manufacture of cement clinker in a rotary vessel which permits the utilization of residual fuels including low grade residual fuels. By residual fuels it is meant, carbonaceous fuels having a desired low volatiles content and high ignition temperature of the non-volatile portion.

It is yet a further object of this invention to provide a process for the manufacture of cement clinker in a rotary vessel characterized by a reduced consumption of premium conventional fuels.

It is another object of this invention to provide a process for the manufacture of cement clinker in a rotary vessel characterized by improved utilization of equipment.

It is yet another object of this invention to provide a process for the manufacture of cement clinker in a rotary vessel characterized by reduced volume of waste gases per unit of product.

It is still another object of this invention to provide a process for the manufacture of cement clinker in a rotary vessel characterized by decreased rates of wear on equipment, refractory linings, and the like.

The present invention is directed to an improvement in the process for the manufacture of cement clinker in an inclined rotary vessel wherein cement raw materials comprising calcareous material, silica-containing material and alumina-containing material are passed through an inclined rotary vessel and heated at calcination and clinkering temperatures by the combustion of fuel in the gaseous atmosphere within said vessel, said improvement comprising incorporating into said raw materials particulate residual fuels having a low volatiles content of not more than about 40% and an ignition temperature of the non-volatile portion of from about 750° F to about 1500° F to provide from about 5 to about 75% of the fuel heat required for the process.

It has been recognized that cement raw materials for a rotary kiln may contain some carbonaceous material which may have a heating value. (See, e.g., U.S. Pat. Nos. 1,323,294 and 3,716,387.) These materials are employed in order to provide components for the cement clinker, and the carbonaceous material that happens to be present burns in the process. Applicant has determined, however, that there are material advantages to be obtained by the combustion of a residual fuel in the bed of an inclined rotary kiln and specifically adds selected solid fuels in controlled amounts to achieve those advantages. For example, addition of a solid residual fuel to provide 20% of the total fuel requirements of a conventional process may reduce the amount of conventionally added fuel by up to 40% because of increased thermal efficiency, thereby yielding up to a 20% decrease in the total energy required per unit of product. The addition of the residual fuel as a separate ingredient permits reasonably complete control of the amount of residual fuel added which then may be regulated according to the individual needs of each process.

The residual fuels employed in this invention have a low volatiles content and a high ignition temperature of the non-volatile portion so that the combustion of these fuels occurs primarily in the calcining zone. Since the residual fuel is in the interior and/or on the surface of the bed itself and in contact with the cement raw materials, heat from the fuel is transferred by conduction, convection and radiation. These as well as possible other factors result in improved thermal efficiency, and consumption of conventional fuels is reduced by an amount greater than the fuel heating value added as residual fuel. The practice of this invention not only increases thermal efficiency but at the same time reduces the consumption of premium conventional fuels and permits the use of substantial amounts of potentially economic residual fuels.

Test results, including optical pyrometer measurements of burning zone temperatures in the kiln and measurements of kiln shell temperatures, indicate that temperatures in a kiln operated according to the present invention are somewhat lower than conventional kiln operating temperatures. The capability of the process of the invention to effectively produce cement clinker at lower kiln operating temperatures is a further indication of the improved thermal efficiency of the process of the invention over conventional processes.

Without being bound to any particular theory of operation, applicants believe that in addition to limiting the combustion of the residual fuel primarily to the calcining zone and possibly increasing the heat transfer effectiveness as a result of the proximity of the fuel to the cement making material, the efficient operation of the process of the invention at lower temperatures may be due in part to reaction of some of the evolved carbon dioxide with some of the carbonaceous fuel which decreases the partial pressure of carbon dioxide in the bed and shifts the equilibrium of the thermal decomposition reaction of calcium carbonate to favor decomposition at lower temperatures.

In addition to the more efficient utilization of energy, operation at lower temperatures yields a further important advantage in that it may increase the operating life of the kiln lining and internal parts such as chains etc. thereby enabling kilns to be used for longer periods before they must be shut down for relining and producing savings in the cost of cement clinker production.

Another advantage of the process of the invention appears in rotary cement kilns equipped with suspension preheater systems wherein cement making feed materials and the kiln exhaust gases are passed through a series of cyclones before the cement making materials enter the kiln proper in order to recover useful heat from the exhaust gases. In conventional operation of such systems, volatile salts are vaporized in the kiln and pass with the exhaust gases into the preheater cyclones where they condense and form deposits which may plug up the preheater system. These deposits in the preheater system in turn necessitate periodic cleaning and frequently require shutdown of the kilns, as often as weekly in some plants, while the accumulated deposits are removed. The energy wasted in allowing the kiln to cool and then bringing it back up to operating temperatures and the concomitant adverse effect on the economies of cement production are apparent. However, in the process of the invention, the lower kiln operating temperatures foster recondensation of the volatile salts in the kiln proper thereby reducing the amount of salts passing into the cyclones and reducing or eliminating the deposits in the preheater system.

Improved thermal efficiency not only reduces the fuel cost per unit of product and results in a reduction in wear on kiln internals such as brick, per unit of product, but since the total fuel consumption is decreased per unit of product, the volume and velocity of the exit gases per unit of product are decreased correspondingly and the size of air pollution control equipment may be less for a plant of given productive capacity.

The practice of this invention permits the production capacity of existing cement rotary kiln installations to be increased and permits the use of smaller size new equipment for a given production capacity.

The residual fuels are employed in the practice of this invention to provide from about 5 to about 75%, desirably from about 5 to about 60%, and preferably from about 30 to about 50% of the total heat required for the process. They generally have a volatiles content of not more than about 40%, desirably not more than about 20% and preferably not more than about 10%. Volatiles content as employed herein refers to the percent of the fuel which is volatilized at about 1000° F, calculated on a moisture and ash-free basis. The residual fuels employed in the practice of this invention will have an ash content of less than about 30% and preferably less than about 10%. Since substantial ignition of the residual fuel in the precalcining zone must be carefully controlled to preclude undesirable effects on thermal efficiency, the non-volatile portion of the residual fuels will have an ignition temperature of from about 750° to about 1500° F, desirably from about 1000° to about 1500° F.

Representative residual fuels for the practice of this invention are coke, coke breeze, char, petroleum coke, organic industrial residues, coal gasification residue, certain coals such as anthracite or low volatile bituminous and the like. It will be understood that a mixture of fuels may be employed as a residual fuel and that the characteristics of a fuel may be tailored by adding volatile or non-volatile ingredients to it. Adjustments in the chemical composition of the cement making feed material may be desirable to compensate for the incorporation into the clinker of substances, such as iron, from the ash of the residual fuel.

In order to improve the setting properties of the ultimate cement product, it is known in the art to add a small amount of calcium sulfate to cement clinker, usually during final grinding. In conventional firing of rotary cement kilns, sulfur in fuels is predominantly carried off in the kiln exhaust gases thereby adding to environmental pollution. In the process of the invention, due to the proximity of the cement making material to the residual fuels incorporated in the bed, retention of sulfur from the fuel in the cement clinker as calcium sulfate may be fostered by appropriate control of conditions such as oxygen concentration, operating temperatures, etc. This reduces the need for subsequent addition of calcium sulfate to the cement clinker.

The exact size and size distribution of the fuel will depend on the particular process and type of fuel employed. The use of larger size particles will tend to reduce gas entrainment and will extend the burning distance in the kiln. The maximum size for any given application will be governed by considerations such as the burn out rate of the residual fuel. Since complete oxidation of larger particles takes longer than that of smaller particles, use of too large fuel particles will overextend the zone in which oxidation of the residual fuel occurs with the undesirable result that still burning fuel particles may pass completely through the calcining and clinkering zones into the cooling zone. The maximum particle size of the residual fuel should be chosen so that even at high rates of throughput through the kiln, complete oxidation of the particulate residual fuel in the bed takes place before discharge from the clinkering zone and preferably in the calcining zone. For example, when petroleum coke is used in a kiln of ordinary size, the maximum size of the coke particles must be less than about one-fourth inch, desirably less than about 8 U.S. screen mesh size and preferably less than about 20 U.S. screen mesh size.

The minimum size for any given application will be governed by considerations such as the volatiles content and entrainment size. Since fine particles may be entrained in the gases passing countercurrently through the kiln, introduction of too small fuel particles may bring about the undesirable result that appreciable amounts of the fuel may be immediately carried off by the exiting waste gases without making any contribution to the heating in the kiln. The minimum particle size of the residual fuel should be chosen so that at most, negligible amounts of the particulate fuel are entrained in the exhaust gases. For example, when petroleum coke is introduced with cement making feed material into a rotary cement kiln, the minimum particle size should be about 325 U.S. screen mesh size. However, in order to avoid needless expenditure of energy and expense in reducing the particle size of a residual fuel, applicants prefer to use fuels where the particle size is predominantly greater than about 200 U.S. screen mesh size.

In order to enhance the compatibility of the fuel and control segregation from the cement raw materials, the fuel may, if desired, be treated with wetting agents, dispersants, anti-foaming agents, additives to control surface tension, additives to decrease clinkering temperature, oxidizing catalysts, subjected to surface electrostatic modification, or the like.

Raw materials for the manufacture of cement are well known and will not be described in detail here. Generally, however, a calcareous material is employed in conjunction with materials that provide $SiO_2$, and $Al_2O_3$. Most often, materials that provide $Fe_2O_3$ also are employed. It will be understood that one additive may supply more than one of the raw material ingredients. For example, a clay may supply both $SiO_2$ and $Al_2O_3$.

Typical cement raw material mixes may contain from about 70% to 80% $CaCO_3$, from about 12 to about 20% $SiO_2$, from about 3 to about 7% $Al_2O_3$, and from about 2 to about 5% $Fe_2O_3$. The raw material mix can, of course, contain other minerals as well and, indeed, many mixes will contain up to about 4% MgO. While the above ingredients and proportions are typical, mixes can vary in proportions and/or ingredients. The raw materials generally are finely powdered and are blended either in the dry state or in aqueous slurries to provide a homogeneous mix. If desired, the raw materials may be pelletized and fed to the kiln.

The particulate residual fuel of this invention may be added at any point in the early stages of the process. For example, the fuel may be added at the time the raw materials are introduced into the rotary kiln. If preheater cyclones are employed in conjunction with the kiln, the fuel can be introduced between the lower cyclones or between the lowest cyclone and the kiln. Indeed, part of the residual fuel may, if desired, be introduced at one or more points in the calcining zone of the kiln. Also different fuel constituents with different desired characteristics may be introduced at one or more points through the process.

The invention may be more readily understood by reference to FIG. 1 which is a schematic flow sheet of the cement manufacturing process of this invention. The invention will first be described with respect to a dry process and thereafter be described with regard to a wet process.

Cement raw materials such as limestone, clay and sand, or the like, are finely ground and intimately mixed to provide a substantially homogeneous mixture at grinding and blending station 1. Residual fuel may be processed to desired particle size distribution at station 2 and may be added directly to the cement raw materials during processing at station 1 or, alternatively, may be added to the raw cement materials as they pass through line 3 to the kiln 7. It should be understood that the residual fuel need not be of the same fineness as the raw materials. In the embodiment shown in FIG. 1 the residual fuel is passed through line 4 to special preparation station 5 wherein the fuel may be treated with wetting agents, dispersants or the like, as noted earlier. The treated fuel is then passed through line 6 and combined with cement raw materials passing through line 3 to kiln 7. Kiln 7 has four operating zones, a precalcining zone 8, a calcining zone 9, a clinkering zone 10 and a cooling zone 11. Conventional fuel is fed to the kiln through line 12 and is combined with preheated air which is introduced into the kiln through line 13. Fuels such as natural gas, oil or powdered coal are conventionally employed in cement manufacturing processes.

As the finely divided cement raw materials pass into the rotating kiln, they are heated from near ambient temperature to about 800° or 1000° F in the pre-calcining zone 8. In this zone the heat of the hot combustion gases from the calcining zone is used to raise the temperature of the raw materials, the chain systems or the like are frequently employed to improve the efficiency of heat exchange between the gases and raw materials. Since residual fuels frequently contain trace elements including vanadium, special precautions may be required to reduce any deleterious effect of trace elements on the chain systems if such systems are employed, on the refractory, or on the environmental quality of waste gases.

The ignition temperature of the non-volatile portion of the residual fuel of the invention is above the temperatures reached in the initial portion of the precalcining zone so that the predominant portion of the residual fuel is not combusted in this zone. In wet process kilns or dry process kilns equipped with waste heat recovery devices such as preheaters, boilers, or the like a greater amount of combustion of volatiles can be tolerated than in the conventional long, dry process kiln previously described where substantial ignition of residual fuels in the precalcining zone is undesirable. Combustion of residual fuel in this zone represents a potential loss of heating efficiency and may increase the temperature of the exit gases from the process. The gases in this zone are normally high in $CO_2$ and it may be desirable in some cases to introduce $O_2$ into this zone to insure that all fuel in, or carried by, the combustion gases has been burned.

The temperature of raw materials is increased from about 1000° to about 2000° F as they pass through the calcining zone 9, and in this zone $CaCO_3$ is decomposed with the evolution of $CO_2$. It is in this zone that the oxidation of the residual fuel principally occurs to provide a portion of the heat required for this phase of the process. Since the residual fuel is initmately mixed with the cement raw materials, the heat transfer from combustion of the fuel is quite efficient. The increased heat transfer rate may reduce the length of calcining zone 9. This phase of the process, therefore, becomes less dependent on the heat transfer from hot gases, allowing the temperature of these gases to be lower, and thus refractory brick life will increase throughout the kiln. If calcining zone 9 is shortened, precalcining zone 8 may be lengthened so that more sensible heat may be recovered from the combustion gases thereby further increasing the thermal efficiency of the process. Reducing calcining zone 9 fuel requirements will permit the selection of smaller equipment for new facilities, will permit an increase in production rates of existing facilities and may reduce gas velocities and dust entrainment for either existing or new facilities. Reduction in the amount of exhaust gases may also allow the use of smaller diameter kilns.

Sufficient air can be introduced into the kiln through line 13 to provide for the combustion of the conventional fuel as well as combustion of the residual fuel or, alternatively, supplemental oxidizing agent, such as air, preferably preheated, can be introduced directly into the calcining zone 9. It is important that sufficient oxygen be supplied to the kiln to maintain oxidizing conditions, although reducing conditions may exist in some localized portions of the bed. Thus it is preferred to maintain in uncombined oxygen level in the kiln exhaust gases of from about 0.5 to about 5.0 percent; desirably from about 0.5 to about 2.0 percent. Failure to maintain adequate oxygen levels may result in detrimental loss of unburned fuel values in the form of carbon monoxide in the kiln exhaust gases and in the form of unoxidized carbon, sulfur or iron in the clinker. Inadequate oxygen levels in the system may also lead to the production of inferior content clinker due to the presence of metallic iron, elemental sulfur or undesirable sulfur compounds in the cement product. The kiln can be equipped, if desired, with means to ensure that the fuel particles in calcining zone 9 will be oxidized at the surface of the bed, or air or oxygen can be introduced into the bed. Since less fuel is consumed per unit of product in the process of this invention, the amount of air required will also be less than that required for conventional processes.

Calcined material at the temperature of about 2000° F then passes into the clinkering or burning zone 10 wherein the temperature is raised to about 2300° – 2900° F. It is in this zone that the primary raw materials are converted into the typical cement compounds: tricalcium silicate, dicalcium silicate, tricalcium aluminate, and tetracalcium-aluminoferrite. The residual fuel incompletely burned in calcining zone 9 burns in the clinkering zone 10 to assist in the heat requirements of this phase of the process.

The cement clinker leaving the clinkering zone 10 passes into cooling zone 11 wherein it is cooled to about 2200° F with the heat being used to further preheat combustion air from line 13. The clinker thereafter passes through line 14 to clinker cooler 15 wherein the sensible heat of the clinker is employed to preheat combustion air. The clinker cooler 15 may be a separate stationary piece of equipment or it may be mounted on the kiln and rotated with it. The clinker itself may be cooled in clinker cooler 15 to near ambient temperature, such as, for example, about 150° F and thereafter may be processed further such as by grinding and the like. Excess air, if any, from clinker cooler 15 is passed through line 16 and processed at 17 for the removal of pollutants. The cleaned air may be passed through line 18 and exhausted through stack 19.

Exit gases from the kiln are passed through line 20 to pollution control processing station 21 wherein dust, and the like, is removed. The cleaned gas is passed through line 22 and exhausted through stack 23. Pollution control equipment for the exit gases may be smaller than in a conventional process because the exit gases are less. The pollution control equipment for air from clinker cooler 15, however, may be somewhat larger than in a conventional process because less air will be sent to the process and more will be exhausted through stack 19.

Instead of adding the raw materials to the kiln as finely divided particles as described above, the raw materials may be agglomerated by the presence of moisture and added to the kiln, such as is done for example in the Lepol process. Moreover, this invention may also be employed in conjunction with a wet process. Dry processes as well as the wet process are well known to those skilled in the art.

In the wet process, the raw materials are added to water and mixed to form a slurry which, as fed to the kiln, generally has a solids content of from about 55 to about 70%. In the wet process the first zone of the inclined rotary kiln is a drying zone wherein the feed is heated to remove water and results in the raw materials being heated to about 200° F. The heat required to dry the slurry is from the heat remaining in the hot gases coming from the precalcining zone. The remaining successive zones of the kiln, that is the precalcining zone, the calcining zone, the clinkering zone and the cooling zone, function as described above.

The shortening of the calcining zone, as described above, results in lengthening of the other zones of the kiln. Lengthening of the clinkering zone has the advantage of increasing the capacity of the kiln. Also, in a wet process kiln, lengthening of the drying zone may increase drying capacity. Moreover, since there is need for heat in the gases coming from the precalcining zone to the drying zone, somewhat more volatiles can more readily be accommodated in the residual fuel when a wet process is employed. Heat from the combustion of such volatiles can be used for drying.

Since the raw materials contain moisture and must be dried, residual fuel having a volatile content up to about 40% may be particularly suited for use in conjunction with the wet process or in a process such as the Lepol process wherein the feed also contains some moisture. In the event that fuels having such high volatile content are employed in a dry process wherein the feed contains very little moisture, it may be desirable to employ waste heat boilers, preheaters or the like to recover the heat of the waste gases and to improve the efficiency of such process. Again residual fuels having a volatile content of less than about 40% might be employed in such a dry process. Such fuels, however, can also be employed in a wet process.

The following examples are included for illustrative purposes only and in no way are intended to limit the scope of the invention.

EXAMPLE 1

A cement kiln 12 feet in diameter and 450 feet long operates at a production of 736 tons per day and requires 5,890,000 BTU's per ton when fired in the conventional way with gas or fuel oil. By adding petroluem fluid coke having about 5% volatiles at 1000° F, a nonvolatiles ignition temperature of about 1200° F, and a heating value of 14,300 BTU/lb. to provide 1,110,000 BTU's/ton, the total heat requirement for the process is reduced to 5,330,000 BTU/ton.

EXAMPLE 2

Example 1 is repeated except that coke was added to provide 5,550,000 BTU/ton. The total heat requirement is reduced from 5,890,000 BTU/ton to 5,610,000 BTU/ton.

EXAMPLE 3

The operation of a dry process rotary cement kiln 9 feet in diameter and 323 feet long fired by a powdered coal burner mounted at the discharge end was modified over a three-day period by adding amounts varying from about 6 lbs. per minute to about 21 lbs. per minute of particulate petroleum coke having a volatile content of 7% and an ash content of 0.3% to the cement making feed material and making corresponding reductions in the amount of powdered coal supplied to the burner. Additional decreases in the amount of coal supplied to the burner were necessary to prevent overheating of the kiln so that the coke supplied from about 10 to over 40% of the process heat required by the kiln. The fan louvers of the kiln were adjusted to maintain the level of oxygen in the exhaust gases between about 1.5 and about 2.0%. Energy consumption per unit of product ranged as low as 3.5 million BTU per ton during two periods of steady state operation with reductions in the amount of energy required per unit of product ranging between 5 and 13% at various levels of operation. The cement making raw material feed rate was increased from an initial value of about 24 tons per hour to over 28 tons per hour with the increase in productive capacity of the kiln ranging as high as 12% during one period of steady state operation. Despite these increases, kiln behavior indicated that the kiln was starved for feed suggesting the possibility of even greater increases, but equipment failure from causes unrelated to the test prevented further increases.

Since modifications of this invention will be apparent to those skilled in the art, it is intended that this invention be limited only by the scope of the appended claims.

What is claimed is:

1. In a continuous process for the manufacture of cement clinker comprising:
   introducing unsintered cement raw materials comprising calcium carbonate containing material, silica containing material and alumina containing material into an inclined rotary vessel comprising a plurality of treatment zones including a calcination zone and a clinkering zone;
   heating said raw materials in said calcination zone under conditions of agitation due to the rotation of said vessel at calcination temperatures generally ranging from about 1000° to about 2000° F, said calcination temperatures being below the temperature of insipient fusion of said cement materials to effect thermal decomposition of calcium carbonate with evolution of carbon dioxide;
   continuously transferring calcined material from said calcination zone into said clinkering zone;
   heating said calcined material in said clinkering zone at sintering temperatures generally ranging from about 2300° to about 2900° F, said sintering temperatures being at or above the temperature of insipient fusion of said cement materials to effect clinkering;
   said heating in said rotary vessel being effected at least in part by the combustion of fuel within the gaseous atmosphere of said vessel;
   the improvement comprising incorporating into said cement raw materials introduced into said rotary vessel particulate residual fuels having a volatiles content not more than about 40%, an ignition temperature of the non-volatile portion of from about 750° to about 1500° F, and an ash content of less than about 30% to provide from about 5 to about 75% of the heat required for said process in said rotary vessel, said volatiles content and said non-volatiles ignition temperature of said residual fuels being such that the principal oxidation of said residual fuels occurs in the calcination zone.

2. The process of claim 1 wherein said residual fuel has a volatiles content of not more than about 20%.

3. The process of claim 2 wherein said residual fuel has a volatiles content of not more than about 10%.

4. The process of claim 1 wherein said residual fuel has an ash content of less than about 10%.

5. The process of claim 1 wherein the non-volatile portion of said residual fuel has an agitation temperature of from about 1000° to about 1500° F.

6. The process of claim 1 wherein said residual fuel provides from about 30 to about 50% of the heat required for the process.

7. The process of claim 6 wherein said inclined rotary vessel is a dry process rotary cement kiln.

8. The process of claim 1 wherein said cement raw materials and the exhaust gases from said inclined rotary vessel are passed through a suspension preheater system prior to introduction of the cement saw materials into said inclined rotary vessel to recover useful heat from the exhaust gases.

9. The process of claim 1 wherein said residual fuel is coke.

10. The process of claim 9 wherein said residual fuel is petroleum coke.

11. The process of claim 1 wherein said residual fuel is char.

12. The process of claim 1 wherein said residual fuel is coal gasification residue.

13. The process of claim 1 wherein said residual fuel is coal.

14. The process of claim 13 wherein said coal is anthracite.

15. Th process of claim 1 wherein at least a portion of said residual fuel is added in the calcining zone of the rotary vessel.

16. The process of claim 1 wherein all of said residual fuel is introduced into the kiln with the raw materials.

17. The process of claim 1 wherein a level of uncombined oxygen of from about 0.5 to about 5.0% is maintained in exhaust gases exiting from the inclined rotary vessel.

18. The process of claim 17 wherein the level of uncombined oxygen in the exhaust gases lies in the range from about 0.5 to about 2.0%.

19. The process of claim 1 wherein the particle size of said residual fuel lies in the range from about 8 U.S. screen mesh size to about 325 U.S. screen mesh size.

20. The process of claim 19 wherein the minimum particle size of said residual fuel is greater than about 200 U.S. screen mesh size.

21. The process of claim 19 wherein the maximum particle size of said residual fuel is less than about 20 U.S. screen mesh size.

22. The process of claim 1 wherein said residual fuel provides from about 5 to about 60% of the heat required for the process.

23. The process of claim 22 wherein the non-volatile portion of the residual fuel has an ignition temperature of from about 1000° to about 1500° F.

24. In a continuous process for the manufacture of cement clinker comprising:
- introducing unsintered cement raw materials comprising calcium carbonate containing material, silica containing material and alumina containing material into an inclined rotary vessel comprising a plurality of treatment zones including a calcination zone and a clinkering zone;
- heating said raw materials in said calcination zone under conditions of agitation due to the rotation of said vessel at calcination temperatures generally ranging from about 1000° to about 2000° F, said calcination temperatures being below the temperature of insipient fusion of said cement materials to effect thermal decomposition of calcium carbonate with evolution of carbon dioxide;
- continuously transferring calcined material from said calcination zone into said clinkering zone;
- heating said calcined material in said clinkering zone at sintering temperatures generally ranging from about 2300° to about 2900° F, said sintering temperatures being at or above the temperature of insipient fusion of said cement materials to effect clinkering;
- said heating in said rotary vessel being effected at least in part by the combustion of fuel within the gaseous atmosphere of said vessel;
- the improvement comprising incorporating into said cement raw materials introduced into said rotary vessel particulate residual fuels having a volatiles content not more than about 40%, the ignition temperature of the non-volatile portion being greater than the temperature reached prior to the calcining zone and less than about 1500° F; said residual fuel having an ash content of less than about 30% to provide at least 5% of the heat required for said process in said rotary vessel, said volatiles content and said non-volatiles ignition temperature of said residual fuels being such that oxidation of the residual fuels occurs primarily in the calcination zone.

* * * * *